No. 635,091. Patented Oct. 17, 1899.
L. DYER.
MECHANISM FOR SOLDERING CAN BODIES.
(Application filed May 12, 1899.)
(No Model.) 2 Sheets—Sheet 1.

Witnesses
Howard D. Orr

Lucius Dyer, Inventor,
By his Attorneys.
C. A. Snow & Co.

No. 635,091. Patented Oct. 17, 1899.
L. DYER.
MECHANISM FOR SOLDERING CAN BODIES.
(Application filed May 12, 1899.)
(No Model.) 2 Sheets—Sheet 2.

Witnesses
Howard D. Orr

Lucius Dyer, Inventor
By his Attorneys.
C. A. Snow & Co.

UNITED STATES PATENT OFFICE.

LUCIUS DYER, OF MILLBRIDGE, MAINE.

MECHANISM FOR SOLDERING CAN-BODIES.

SPECIFICATION forming part of Letters Patent No. 635,091, dated October 17, 1899.

Application filed May 12, 1899. Serial No. 716,556. (No model.)

*To all whom it may concern:*

Be it known that I, LUCIUS DYER, a citizen of the United States, residing at Millbridge, in the county of Washington and State of Maine, have invented a new and useful Mechanism for Soldering Can-Bodies, of which the following is a specification.

My invention relates to mechanism for soldering cylindrical and other can-bodies; and the object in view is to provide mechanism for accomplishing the soldering of the side seam of a can-body with facility and at the minimum cost, and particularly to provide a simple can-holding device by which the can is supported during the final step of the operation and by which it is carried over a heater to complete the operation of soldering.

Further objects and advantages of this invention will appear in the following description, and the novel features thereof will be particularly pointed out in the appended claims, it being understood that the improvement is susceptible of various changes in the form, proportion, and minor details of construction without departing from the spirit or sacrificing any of the advantages thereof.

To a full disclosure of the invention an embodiment thereof is shown in the accompanying drawings, wherein—

Figure 1:
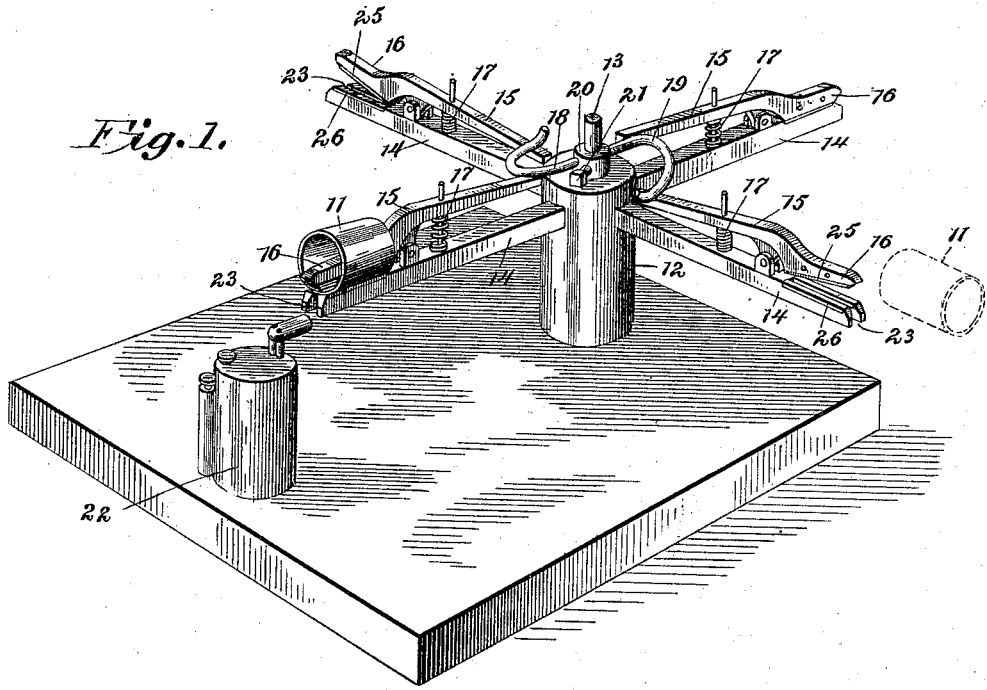
Figure 2:
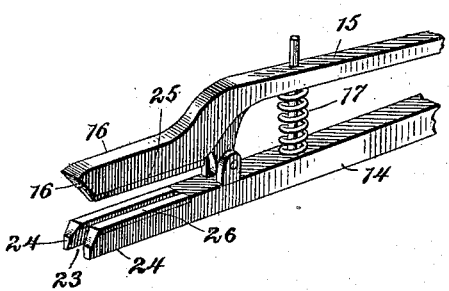
Figure 3:
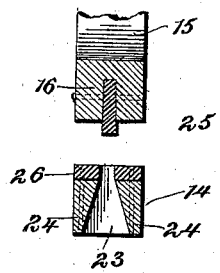
Figure 4:
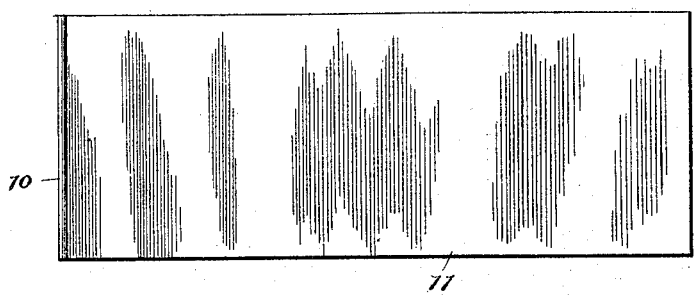
Figure 5:
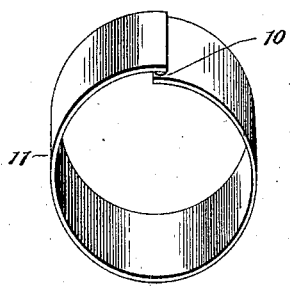
Figure 6:
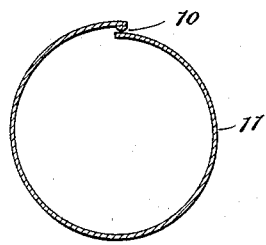
Figure 7:
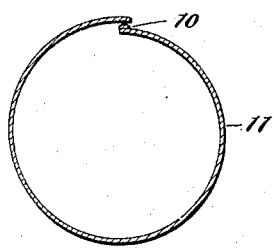

Figure 1 is a perspective view of a can supporting and heating device constructed in accordance with my invention. Fig. 2 is a detail view in perspective of a portion of one of the can-holding arms with the jaws of the clamp separated to show the slot in the lower jaw to allow the passage of flame to the portion of the wall of the can adjacent to the seam. Fig. 3 is a transverse sectional view of the jaws of the holder to show the slate or heat non-conducting facing elements thereof. Fig. 4 is a view of a portion of a can-body blank. Fig. 5 is a view of the blank after having been rolled to overlap the edges. Figs. 6 and 7 are detail sectional views of the edge portions of a blank, showing different arrangements of the bead or film of solder thereon.

Similar reference characters indicate corresponding parts in all the figures of the drawings.

In carrying out my invention I arrange the blanks 11, each of which has a bead of solder 10 upon one edge, in a holder or carrier whereof each blank is engaged adjacent to its overlapping solder-supplied edges by a clamp to hold said edges firmly in contact, and while thus held the can, upon the line of the seam, is exposed to a heating device, such as a tinner's torch or the equivalent thereof, the heat being applied during the compressive action of the clamp, whereby as the solder is remelted by the heat the edges of the blank are pressed together, after which the cooling of the device completes the operation.

I prefer to employ a holder or carrier (shown in Figs. 1 to 3, inclusive) consisting of a sleeve 12, mounted upon a suitable standard or spindle 13 and having radial arms 14, of any desired number, terminally fitted with clamps for engaging the can-blanks. In the construction illustrated the outer extremity of each radial arm forms the lower jaw of a clamp, and pivoted to said arm or otherwise connected therewith for swinging movement is a lever 15, of which the outer extremities forms the coöperating jaw 16 of the clamp or can-engaging device. The inner extremity or arms of said levers are arranged in operative relation with actuating-springs 17 and also may be arranged in operative relation with tripping devices for depressing said inner ends of the levers, and thus separating the jaws of the clamps to facilitate the introduction of a can and the discharge thereof after the remelted solder has become cooled. In the construction illustrated the standard or spindle upon which the rotary frame of the holder is mounted is provided with cam-shaped arms 18 and 19, carried by a sleeve or collar 20, which is mounted for vertical adjustment upon the spindle and is adapted to be held at the desired adjustment by means of a set-screw 21. One of these arms is adapted to open the jaws of the clamps successively to release the cans, while the other is designed to open the jaws to allow the introduction of the cans. It will be understood, however, that one of these trips may be replaced by manually-operable means for accomplishing the same object, whereby the attendant who disposes the cans in the jaws preparatory to the reheating or remelting step may control the opening and closing of the jaws.

The arms of the holder or carrier are adapted to pass successively over a heating device 22, consisting of a tinner's torch or the equivalent thereof, the flame from which is projected at a suitable angle to be applied to the can throughout the length of the seam which is to be formed. In order to insure the desired application and concentration of the heat, however, I prefer to construct the lower jaw of each clamp with a longitudinal slot 23, bounded by parallel jaw members 24, and also it is preferable to downwardly deflect the walls of this slot, whereby the flame from the burner or heating device in entering the slot at its lower side passes upward between the walls formed by the opposing faces of the jaw members and is concentrated upon the can-blank upon a line coincident with the proposed seam, while said flame is held out of contact with other portions of the can. This insures a promptness in accomplishing the necessary heating of the portions of the blank adjacent to the seam, which cannot be attained when the flame of the heater is distributed or is allowed to come in contact with adjacent portions of the blank.

To prevent the solder from causing adherence of the jaws to the can and also to prevent the rapid conduction of heat from the portions of the can adjacent to the seam, I preferably provide the jaws of the clamp with heat non-conducting facings or contacts 25 and 26, of slate or analogous material, the upper jaw having a single longitudinal contact, while the lower jaw is provided, respectively, upon its members with parallel facings, between the planes of which the contact-strip of the upper jaw is disposed. Thus in operation the can-blanks after being rolled or formed by any suitable means and in accordance with any preferred process are placed successively upon the holder or carrier, with the overlapped edges or seam portions engaged between the jaws, after which the holder or carrier is swung to convey the can over the flame of the heating device, where but a moment is necessary to remelt the solder and allow it to flow freely between the overlapped edges. The pressure of the jaws continues during this remelting operation and subsequent thereto, and hence when the said can is again removed from the flame and the parts thereof are allowed to cool the result is the efficient formation of a seam without further manipulation upon the part of the manufacturer.

Having described my invention, what I claim is—

1. In a can-forming machine, the combination with a table, of a standard projecting therefrom, a series of radially-arranged arms rotatably secured to said standard, the outer end of each arm being provided with a longitudinal slot, the walls of which diverge downward, a jaw movably secured upon each arm, the clamping edge of which is located above and intermediate the walls of said slot, a flame-projecting heater located beyond the path of the outer ends of said arms, the mouth of said heater being in substantially the same horizontal plane with the slots of said arms and projecting toward the standard, and means for operating the movable jaws.

2. In a can-forming machine, the combination with a table, of a standard projecting therefrom, a sleeve upon the standard, radially-arranged arms projecting from the sleeve in the same horizontal plane with each other, the outer end of each of which arms is slotted longitudinally, a jaw pivotally secured upon each arm, the clamping edge of which is above and intermediate the walls of the slotted portion of the arm and the inner end is adjacent to the standard, a collar adjustably secured upon the standard above the sleeve, two curved arms projecting from said collar in position to engage with the inner ends of said movable jaws, and a heating device beyond the path of the outer ends of said arms and in substantially the same horizontal plane with the slots thereof, the mouth of which projects toward the standard.

3. In a can-forming machine, the combination with a pair of clamping-jaws, the lower one of which is slotted longitudinally and recessed upon its upper surface, and the under surface of the upper jaw is recessed longitudinally, and a piece of non-heat-conducting material in each of said recesses, and a flame-projecting heating device beyond the circular path of said jaws and in substantially the same horizontal plane with the slots thereof, and means for operating the jaws.

In testimony that I claim the foregoing as my own I have hereto affixed my signature in the presence of two witnesses.

LUCIUS DYER.

Witnesses:
ANSELL M. SAWYER,
JOSIE E. SAWYER.